(12) United States Patent
Liu et al.

(10) Patent No.: US 7,655,142 B2
(45) Date of Patent: Feb. 2, 2010

(54) DYNAMIC CONTROL OF MEMBRANE BIOREACTOR SYSTEM

(75) Inventors: Wenjun Liu, King of Prussia, PA (US); Fufang Zha, West Ryde (AU); Matthew Kuzma, Seattle, WA (US); Edward John Jordan, Lenexa, KS (US)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 12/089,238

(22) PCT Filed: Oct. 6, 2006

(86) PCT No.: PCT/AU2006/001472

§ 371 (c)(1),
(2), (4) Date: Apr. 4, 2008

(87) PCT Pub. No.: WO2007/038843

PCT Pub. Date: Apr. 12, 2007

(65) Prior Publication Data

US 2008/0314829 A1      Dec. 25, 2008

(30) Foreign Application Priority Data

Oct. 6, 2005     (AU) .............................. 2005905520

(51) Int. Cl.
*C02F 3/00*      (2006.01)

(52) U.S. Cl. ...................................................... 210/614
(58) Field of Classification Search .................. 210/614
See application file for complete search history.

(56) References Cited

U.S. PATENT DOCUMENTS

| | | | | |
|---|---|---|---|---|
| 6,055,524 | A | 4/2000 | Cheng | 706/23 |
| 6,609,070 | B1 * | 8/2003 | Lueck | 702/50 |
| 7,279,102 | B2 * | 10/2007 | Johnson et al. | 210/607 |
| 2008/0296220 | A1 * | 12/2008 | Fry et al. | 210/610 |

FOREIGN PATENT DOCUMENTS

| WO | WO1998/034878 A1 | 8/1998 |
|---|---|---|
| WO | WO2006/071716 A2 | 7/2006 |

OTHER PUBLICATIONS

International Search Report dated Nov. 27, 2006 for Application No. PCT/AU2006/001472.
International Report on Patentability dated Sep. 10, 2007 for Application No. PCT/AU/2006/001472.

* cited by examiner

*Primary Examiner*—Chester T Barry

(57) ABSTRACT

A method of controlling the operating parameters of a membrane bioreactor system, the method including the steps of determining a control algorithm based on the relationship between the value of a parameter of the influent provided to the membrane bioreactor system and an optimal performance measurement parameter of the system and controlling one or more operating parameters of the membrane bioreactor system using the determined control algorithm.

5 Claims, 5 Drawing Sheets

DYNAMIC CONTROL OF MEMBRANE BIOREACTOR SYSTEM

CROSS REFERENCE TO RELATED APPLICATIONS

This application is a U.S. national stage application and claims the benefit under 35 U.S.C. §371 of International Application No. PCT/AU2006/001472 filed on Oct. 6, 2006, entitled DYNAMIC CONTROL OF MEMBRANE BIOREACTOR SYSTEM, which is based on Australian Patent Application No. 2005905520 filed on Oct. 6, 2005, entitled DYNAMIC CONTROL OF MEMBRANE BIOREACTOR SYSTEM, each of which is entirely incorporated herein by reference for all purposes, and to which this application claims the benefit of priority.

TECHNICAL FIELD

The present invention relates to membranes bioreactor systems and, more particularly, to methods for dynamic control of the operation of such systems.

BACKGROUND OF THE INVENTION

Membrane Bioreactor (MBR) systems have many advantages over the traditional activated sludge systems such as small foot print, better treated water quality and no sludge bulking. Such systems, however, do have a number of problems such as the high energy consumption to supply oxygen to bioreactor with high mixed liquor concentration, difficulties in handling large influent flow variations and low biological phosphorous removal potential.

The MBR is a dynamic system that never reaches steady state. The dynamic factors include:

Year around seasonal variation of influent and mixed liquor temperature.

Diurnal, weekly and seasonal variation of influent flow rate.

Diurnal, weekly and seasonal variation of pollutant concentration.

Membrane permeability before and after membrane cleaning.

DISCLOSURE OF THE INVENTION

The present invention seeks to overcome at least some of the above problems by providing a control algorithm, which seeks to dynamically optimize the operation parameters of the MBR system in order to reduce energy consumption, to handle and influent flow variation in a cost effective way and to improve biological phosphorus removal potential.

According to one aspect, the present invention provides a method of controlling the operating parameters of a membrane bioreactor system, the method including the following steps:

a) determining a control algorithm based on the relationship between the value of a parameter of the influent provided to the membrane bioreactor system and an optimal performance measurement parameter of the system; and b) controlling one or more operating parameters of the membrane bioreactor system using the determined control algorithm.

Preferably, the parameter of the influent includes one or more of the following: temperature of the influent, flow rate of influent into the system and organic load of influent.

Preferably, the optimal performance parameter includes one or more of the following: sludge retention time or sludge age (SRT), mixed liquor suspended solid concentration (MLSS), dissolved oxygen (DO), food to micro-organism ratio (F/M), nitrification rate and phosphorous removal rate.

For preference, the operating parameters of the membrane bioreactor include aeration gas flow to the system and mixed liquor circulation rate.

The invention also includes apparatus for performing the control method.

BRIEF DESCRIPTION OF DRAWINGS

Preferred embodiments of the invention will now be described, by way of example only, with reference to the accompanying drawings in which.

DESCRIPTION OF PREFERRED EMBODIMENTS

Most biological reactions rates are very sensitive to water temperature. For example, the specific growth rate of nitrification bacteria can be described as $$\mu = \mu_{20C} A^{temperature-20} \tag{1}$$

Where A is a temperature correction coefficient. Generally speaking nitrification rate at 10° C. is only half or less of that at 20° C.

The influent water temperature and mixed liquor temperature varies seasonally. In north part of North America, Europe and Asia, the influent temperature in winter can be very cold, thus the slow nitrification rate usually becomes the determining factor when calculating mixed liquor concentration, SRT and volume of the membrane bioreactor.

Although the membrane bioreactor system, including the mechanical equipment and bioreactor volume, is typically designed based on the worst situation, the present invention seeks to provide a dynamic control system to optimise the operation parameters to reduce the operation cost and improve effluent quality.

Figure 1:
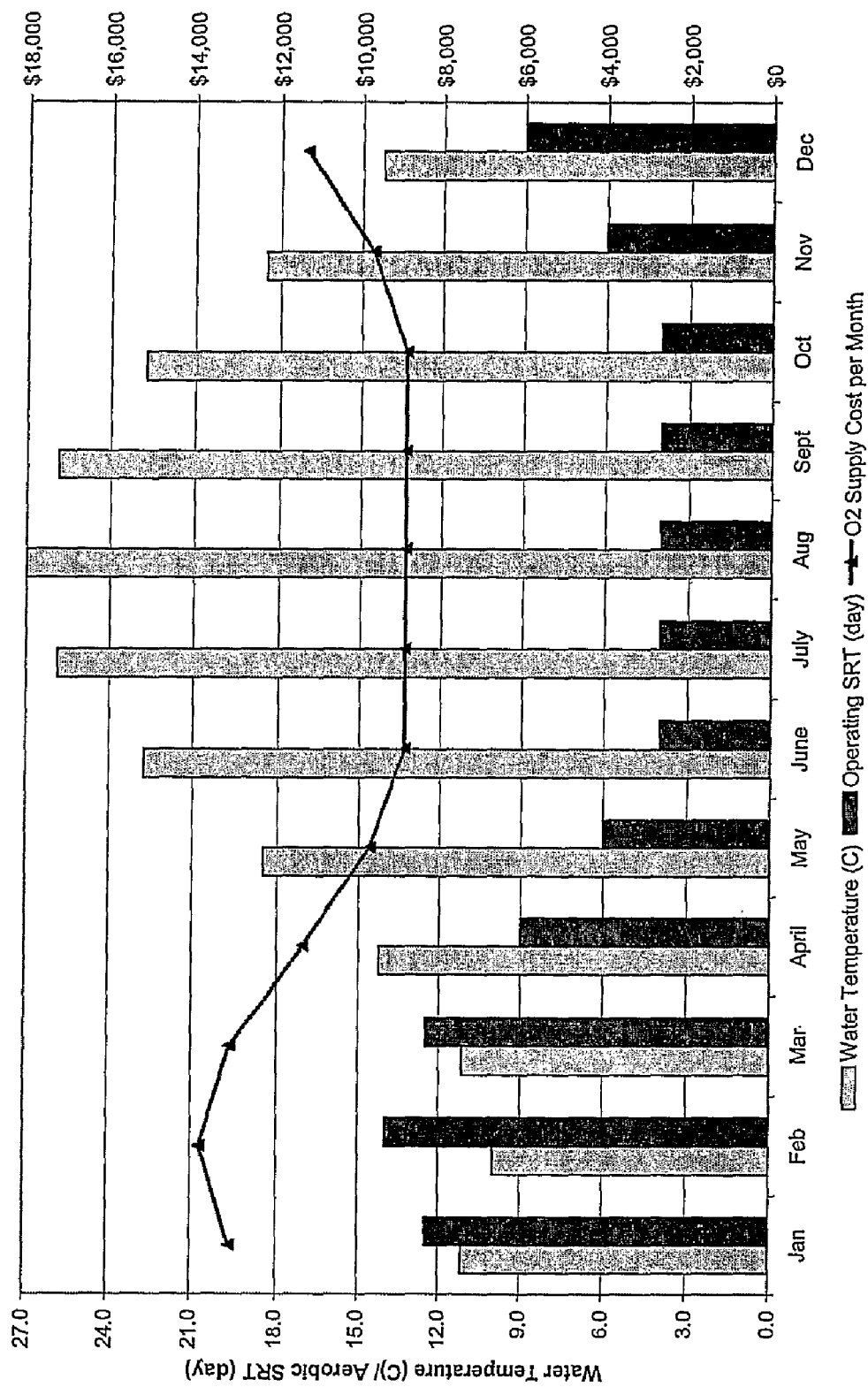
FIG. 1 shows a graph of inflow water temperature, Aerobic SRT and Oxygen Supply Cost variation for a typical membrane bioreactor system over an annual period.

In a typical membrane bioreactor system assuming the influent the biochemical oxygen demand (BOD)=200 mg/l, the Total Kjeldahl Nitrogen (TKN)=45 mg/l and total suspended solids (TSS)=150 mg/l the effect of seasonal influent temperature variation between 10° C. and 27° C. is shown in FIG. 1.

In order to completely nitrify the influent, the operating parameters are set at mixed liquor suspended solids (MLSS) =10,000 mg/l, aerobic solids retention time (SRT$_{OX}$)=14 days and aerobic hydraulic retention time (HRT$_{OX}$)=6.1 hours. After the volume of the membrane bioreactor is determined, the average hydraulic retention time ($HRT_{OX}$) does not change. However, using biological model, the control algorithm calculates the optimised aerobic $SRT_{OX}$ and MLSS concentration based on the influent temperature. In this example, the dictating equations for the control algorithm are as follows:

$$\text{Aerobic tank volume } V_{ox} = Q^* HRT_{ox} = Q^*(S_0-S)/(U^*MLVSS) \quad (2)$$

where

Q: wastewater influent flowrate $S_0$ and S: substrate concentration in the influent wastewater and the treated effluent MLVSS: mixed liquor volatile suspended solid concentration U: substrate utilization factor and $$U = (1/SRT_{ox} + k_d)/Y \quad (3)$$

Where $k_d$ and Y are respectively maximum yield coefficient and endogenous decay coefficient.

$$SRT_{ox} = f/(\mu - k_d) \quad (4)$$

Where f is the safety factor.

When temperature increases, the specific growth rate, $\mu$, increases according to Equation (1). This results in a reduction of $SRT_{ox}$ required to achieve nitrification and BOD oxidation (Equation 4). If the solids retention time (SRT) is adjusted to a lower value, accordingly, the substrate utilization factor will be increased (Equation (3)). Because the design of the system is based on the worst case scenario (lowest temperature) and the tank volume or hydraulic retention time (HRT) is fixed, Equation (2) shows that MLVSS can be reduced for a higher utilization factor U. Therefore, during the warmer seasons, the SRT and MLSS concentration can be lowered using the dynamic control of this embodiment of the invention. A lower MLSS concentration in the bioreactor reduces the air supply requirement, mixed liquor circulation rate and the filtration load to the membranes. This is described in detail below.

Embodiments of the present invention enable a reduction in the energy consumption required to transfer oxygen to the membrane bioreactor.

As a high loading rate process, membrane bioreactor processes typically use a fine bubble diffuser to transfer oxygen into the bioreactor to maintain the activity of aerobic microorganisms so the organic pollutant and ammonia can be biologically oxidized. The amount of oxygen containing gas (usually air) the bioprocess blower needs to supply is mainly determined by the organic load and oxygen mass transfer coefficient of the system. The oxygen transfer coefficient in mixed liquor environment is different from the oxygen transfer coefficient in clean water environment, and is described in Equation 5.

$$k_L a = \alpha \times k_L a\_clean\_water \quad (5)$$

Figure 2:
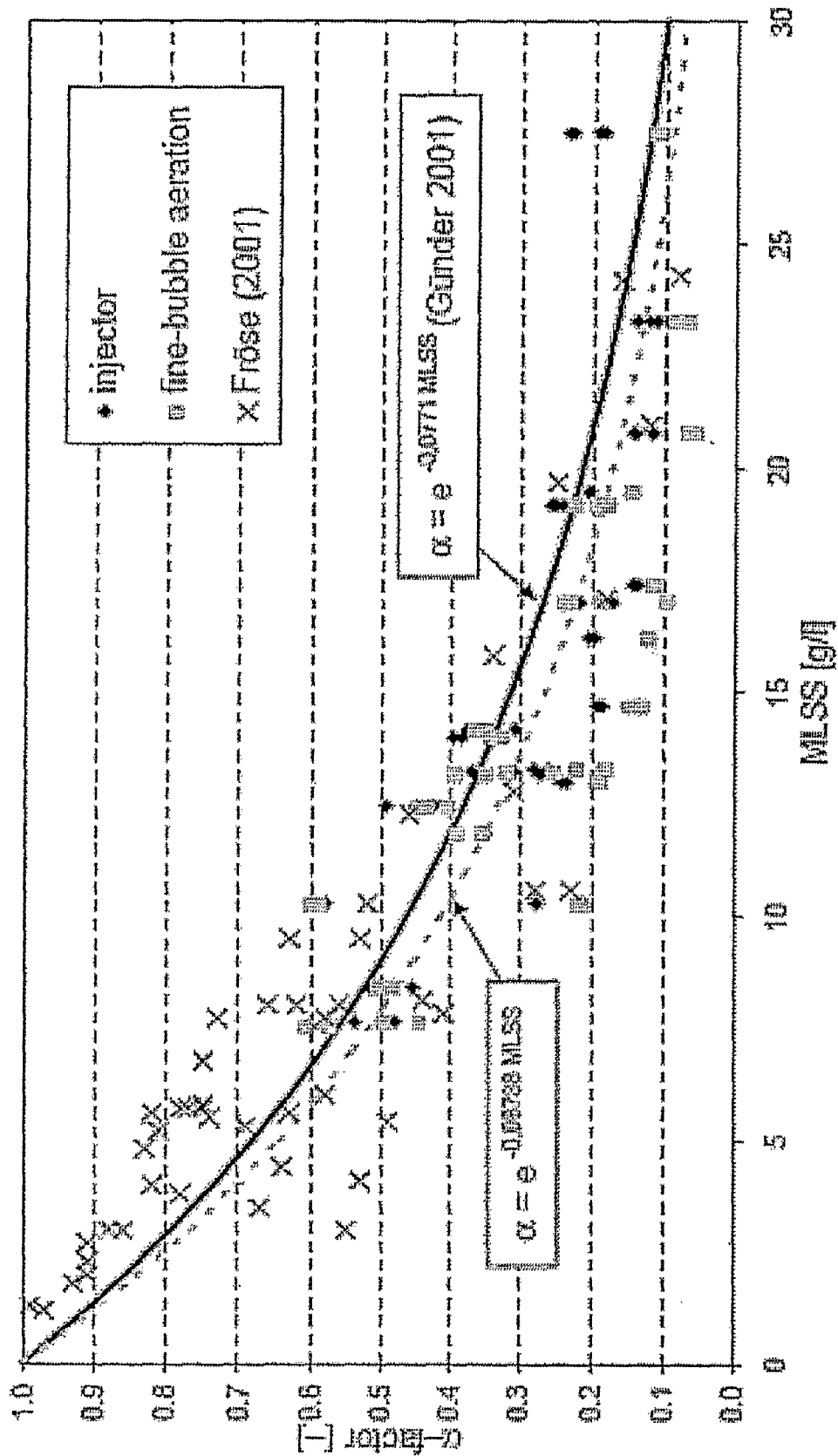
FIG. 2 shows a graph of a factor against Mixed Liquor Suspended Solids using injector and fine bubble aeration.

Recently, a strong correlation has been found between the oxygen transfers rate ($\alpha$) and mixed liquor suspended solids (MLSS), as is shown in FIG. 2.

Based on water temperature, the control algorithm calculates the optimised aerobic solids retention time ($SRT_{OX}$) and guides the system operators to gradually increase or decrease the sludge waste. Because the MLSS concentration is reduced in warmer months, the $\alpha$ value and the oxygen transfer coefficient will increase, e.g. from 0.46 in the winter months to 0.79 in the summer months. As the oxygen transfer coefficient increases, air flow requirements from the bioprocess blower will decrease resulting in significant energy savings for running the bioprocess blower.

It has also been found that an additional positive effect is provided by the low air flow rate itself increasing the oxygen transfer coefficient. When the air flow rate delivered by bioprocess blowers reduces, the air flow rate per square foot of fine bubble diffuser also reduces. In this situation, air bubbles size coming out of the fine bubble aerator decreases, and provides more surface area to further increase the oxygen transfer coefficient.

For most membrane bioreactor systems, the bioprocess blower is the largest equipment in the system, thus any energy saving in using the bioprocess blower can generate a significant economical benefit to the end users.

A further benefit provided by the embodiments of the present invention is a reduction the energy consumption of membrane circulation pump.

The main purpose of circulating mixed liquor between bioreactor and a membrane tank (MT) is to reduce the MLSS concentration in the membrane tank, as the membrane permeate contains almost no suspended solids. If membrane circulation ratio is defined as the flow rate entering the membrane tank divided by average daily flow rate, this ratio can be calculated based on steady state solids mass balance of membrane tank as shown in Equation 6 (assuming no or ignoring sludge wasting).

$$\text{Mem\_Cir\_Ratio} = \frac{\text{Max\_MLSS\_MT}}{\text{Max\_MLSS\_MT} - MLSS} \quad (6)$$

Figure 3:
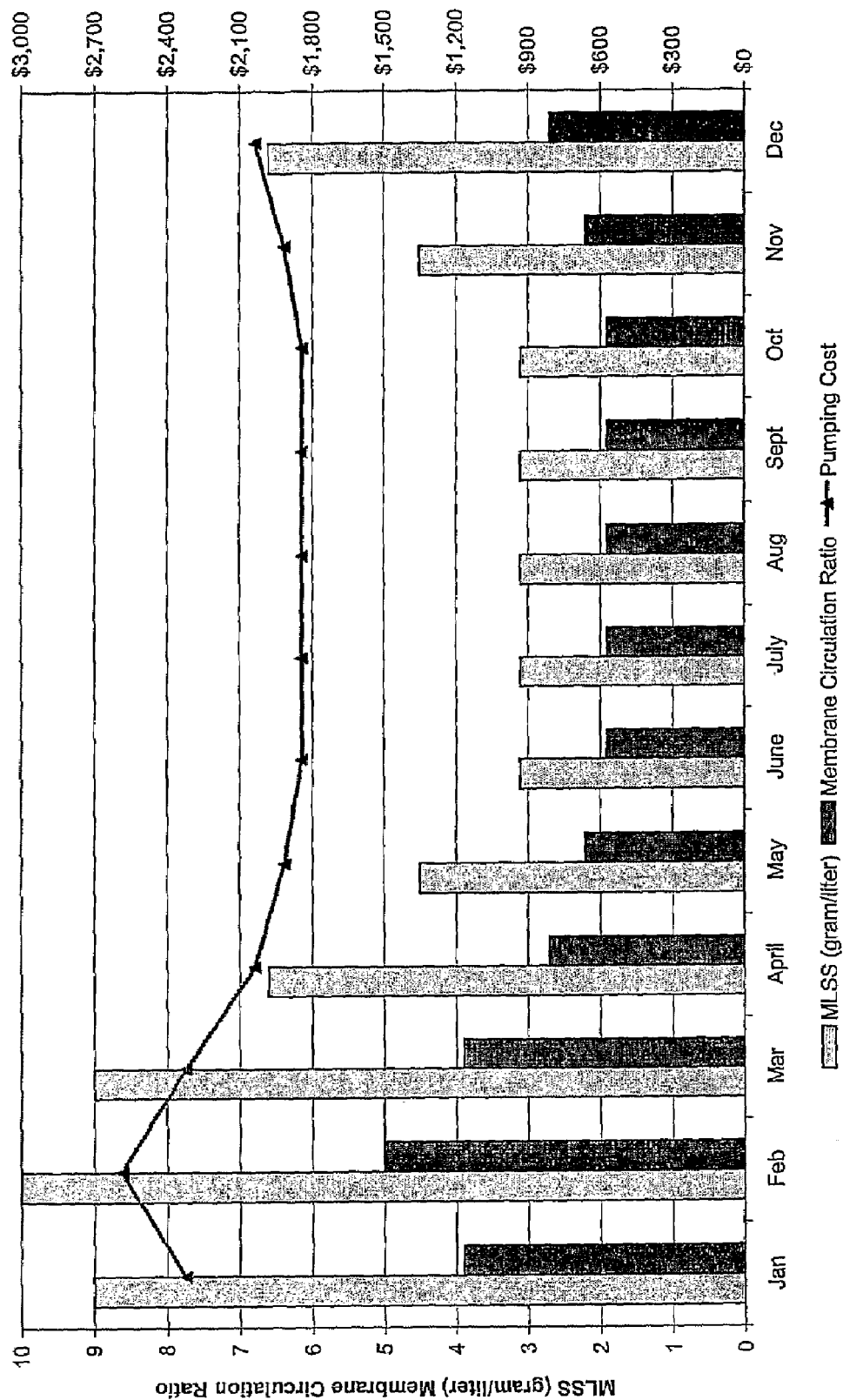
FIG. 3 shows a graph of MLSS, Membrane Circulation Ratio and Circulation Pumping Cost over an annual period for a typical membrane bioreactor system.

Assuming the maximum MLSS concentration in the membrane tank is 12,000 mg/l, the control algorithm calculates the membrane circulation ratio based on the MLSS concentration at different months of the year as shown in FIG. 3. Assuming a variable flow drive (VFD) is used to drive the membrane circulation pump(s), which pump mixed liquor into the membrane tank, the pumping energy will reduce when the flow rate decreases.

When measuring the effect of the control system the minimum membrane circulation ratio was set at 190%, therefore the MLSS concentration from June to October is only 6,544 mg/l, in comparison with 12,000 mg/l if there is no SRT/MLSS control. The low solid concentration in the membrane tank may also reduce membrane fouling risk, and/or help the decrease in energy consumption of membrane blower.

The control system according to embodiments of the invention may also be used to increase-biological phosphorous removal. The mechanism of biological phosphorous removal is to provide a favorable environment for phosphorus accumulation organisms and increase sludge waste amount so that phosphorus is eventually removed in the waste activated sludge (WAS) stream. The control system according to embodiments of the invention decreases the solids retention time (SRT) when the influent temperature is warm. Therefore, it will also improve biological phosphorous removal. Biological phosphorous removal is sensitive to influent volatile fatty acid (VFA) concentration, which in most circumstances is not measured. The VFA concentration in warmer months is higher, therefore it is desirable to decrease the SRT and start biological phosphorous removal.

Figure 4A:
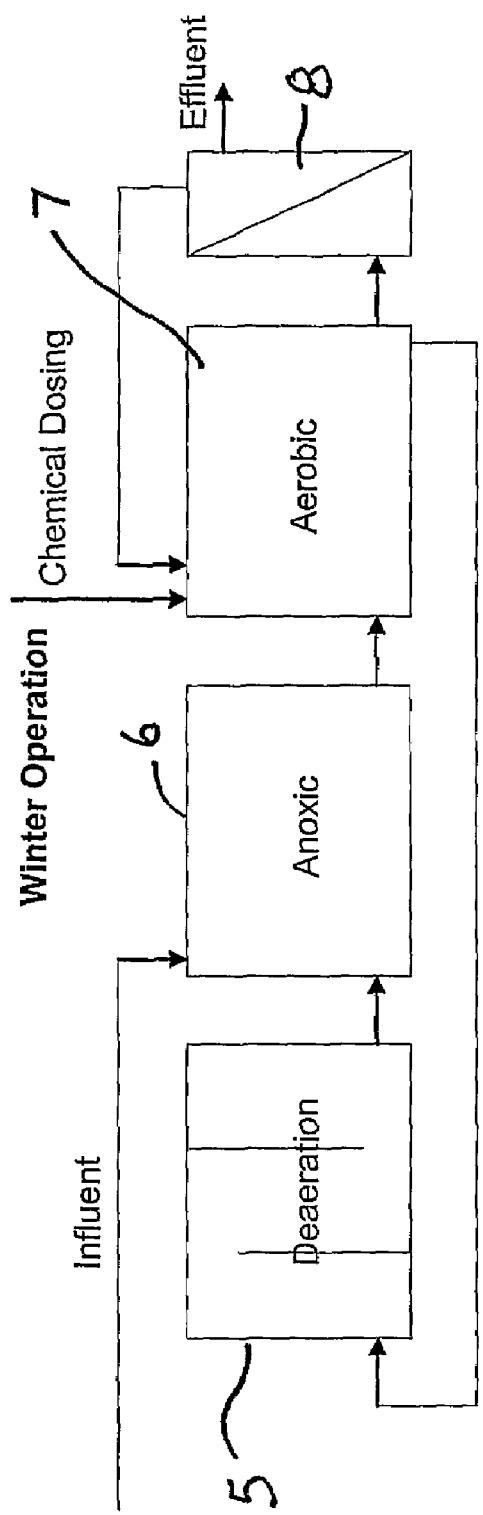
FIGS. 4a and 4b show a schematic diagram of membrane bioreactor system operating in summer and winter respectively where biological phosphorous removal is switched off during winter months.
Figure 4B:
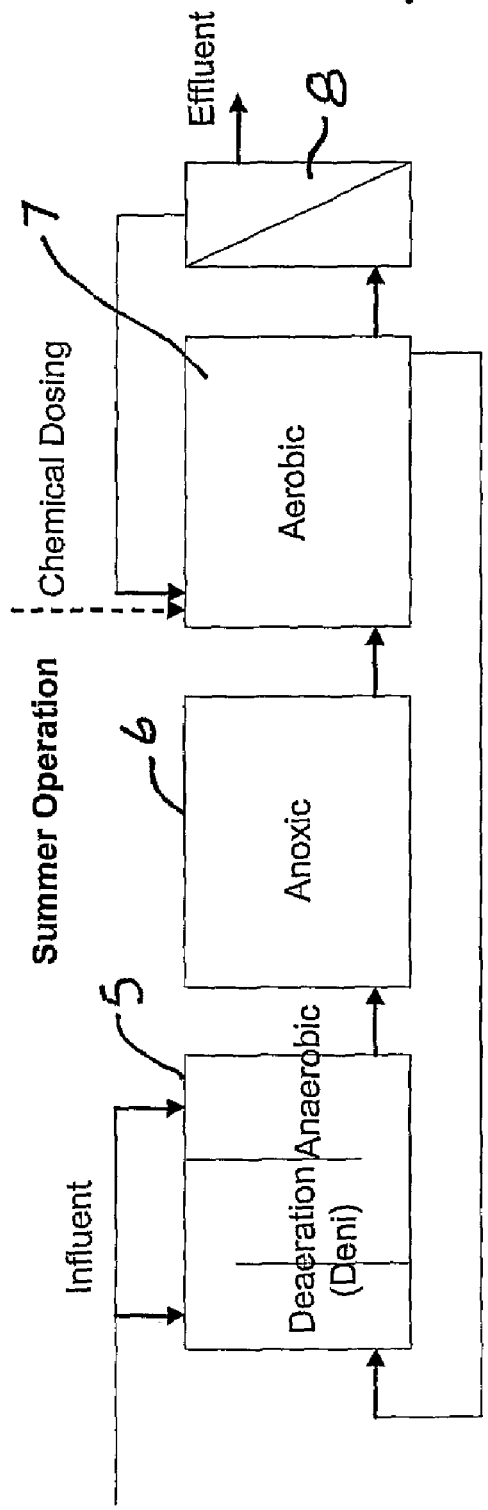

One process embodiment, where biological phosphorus removal process is switched on and off during the year depending on seasonal conditions, is shown in FIGS. 4a and 4b. The membrane bioreactor illustrated in FIGS. 4a and 4b consists of three zones, a de-aeration zone 5, an anoxic zone 6, and an aerobic zone 7, the aerobic zone 7 feeding a membrane filter 8. The zones are connected in series and activated sludge from the aerobic zone 7 is fed back to the system through a de-aeration zone 5 which serves to remove oxygen-containing gas from the mixture. Feed from the aerobic zone 7 is circulated through the membrane filter 8 which removes effluent. In the cold months, as shown in FIG. 4*a*, the influent enters anoxic zone 6, and phosphorus is removed by chemical precipitation in the aerobic zone 7. In the warmer months, as shown in FIG. 4*b*, part of the influent enters the second part of de-aeration zone 5 causing it to become an anaerobic zone. Phosphorus is removed by biological phosphorous removal and chemical precipitation in the aerobic zone 7 if necessary. As part of phosphorous is removed by a biological mechanism, the amount of chemical dosing and the chemical sludge generated is reduced, even if chemical precipitation is still necessary.

Figure 5A:
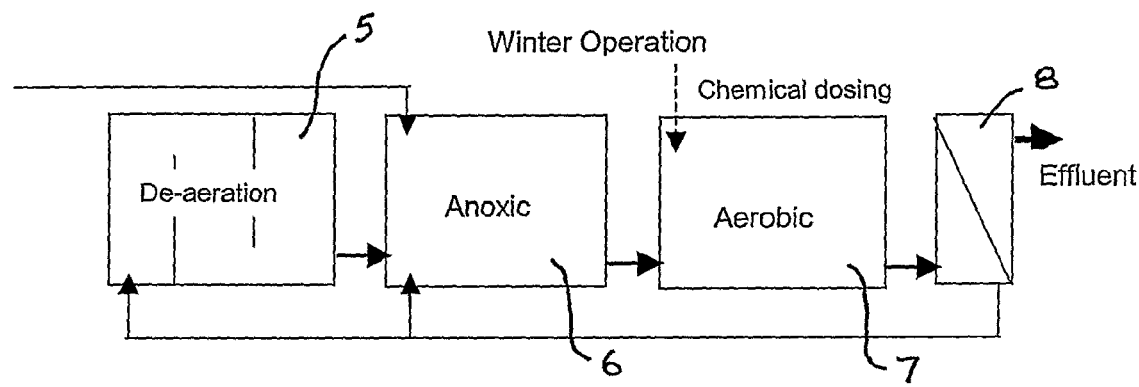
FIGS. 5a and 5b show a schematic diagram of another embodiment of a membrane bioreactor system operating in summer and winter respectively where biological phosphorous removal is switched off during winter months.
Figure 5B:
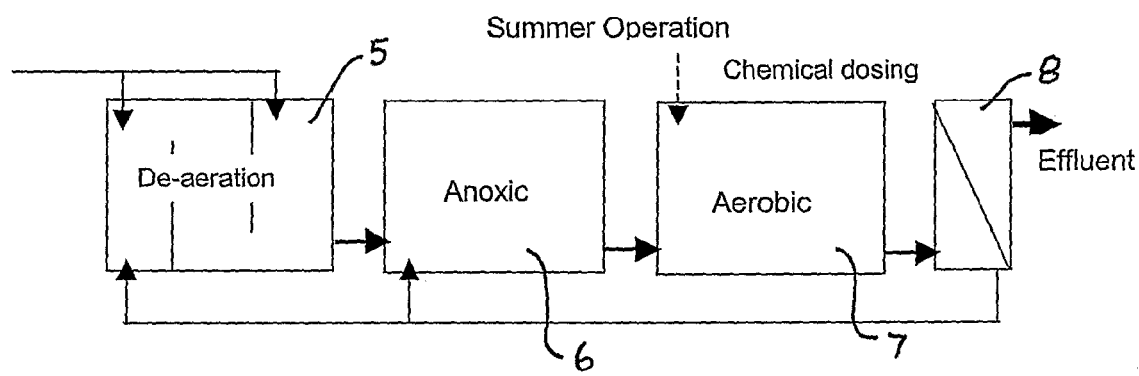

FIGS. 5*a* and 5*b* illustrate another embodiment where mixed liquor is circulated from membrane filter 8 directly to the de-aeration zone 5. The de-aeration zone 5 helps to reduce dissolved oxygen (DO) and encourages the denitrification in the anoxic zone 6.

The control algorithm can also take into account influent flow variations. When the influent flow is low, both the air supply and mixed liquor circulation rate are reduced using a VFD (variable flow drive) according to the biological requirement. The membrane filtration can also be set at an intermittent mode. During the resting period, the scour air used to clean the membranes is only required to pulse the membranes for a short period of time, and the mixed liquor flow to membrane filter 8 is not required in the embodiment shown in FIG. 4 and at a reduced rate in the embodiment shown in FIG. 5 to meet the denitrification requirement.

It will be appreciated that sophisticated control algorithms such as Neural Network algorithms may be used to further refine the control algorithms described. Such an algorithm may be used to predict influent temperature and flow rate based on weather forecast data. The predicted parameters can then be input to the control algorithm to optimise operation of the membrane bioreactor system.

It will be appreciated that further embodiments and exemplifications of the invention are possible without departing from the spirit or scope of the invention described.

The invention claimed is:

1. A method of controlling the operating parameters of a membrane bioreactor system, the method comprising the steps of:
   a) determining a control algorithm based on the relationship between the value of a parameter of the influent provided to the membrane bioreactor system and an optimal performance measurement parameter of the system; and
   b) controlling aeration gas flow and mixed liquor circulation rate operating parameters of the membrane bioreactor system using the determined control algorithm.

2. A method according to claim 1 wherein the parameter of the influent includes one or more of the following: temperature of the influent, flow rate of influent into the system and organic load of influent.

3. A method according to claim 1 wherein the optimal performance parameter includes one or more of the following: sludge retention time or sludge age (SRT), mixed liquor suspended solid concentration (MLSS), dissolved oxygen (DO), food to micro-organism ratio (F/M), nitrification rate and phosphorous removal rate.

4. A method according to claim 1 wherein a value of the parameter of the influent is determined using a prediction algorithm.

5. A method according to claim 4 wherein the prediction algorithm determines the value of the parameter of the influent based on weather forecast data.

* * * * *